United States Patent [19]

Watanabe

[11] Patent Number: 5,325,979
[45] Date of Patent: Jul. 5, 1994

[54] FUEL ERRONEOUS SUPPLY PREVENTION SHUTTER

[75] Inventor: Hideaki Watanabe, Okayama, Japan

[73] Assignee: O M Industrial Co., Ltd., Okayama, Japan

[21] Appl. No.: 36,512

[22] Filed: Mar. 24, 1993

[51] Int. Cl.[5] .............................................. B67C 3/34
[52] U.S. Cl. .................... 220/86.2; 141/348
[58] Field of Search ............... 220/86.1, 86.2, 86.3; 141/348; 251/149.2, 348

[56] References Cited

U.S. PATENT DOCUMENTS

| | | | |
|---|---|---|---|
| 4,034,784 | 7/1977 | Ball et al. | 220/86.2 X |
| 4,248,279 | 2/1981 | Warmbold | 220/86.2 X |
| 4,362,036 | 12/1982 | Shanklin | 220/86.2 X |
| 4,424,839 | 1/1984 | Otani et al. | 220/86.2 X |
| 4,527,601 | 7/1985 | Middleton et al. | 220/86.2 X |
| 4,529,097 | 7/1985 | Larson | 220/86.2 |
| 4,733,791 | 3/1988 | Sinclair | 220/86.2 |

*Primary Examiner*—Steven M. Pollard
*Attorney, Agent, or Firm*—Koda and Androlia

[57] ABSTRACT

The prevent invention relates to a shutter of a leaf spring type supported at a filler neck portion of a fuel filler pipe by a shutter support portion within the filler pipe. The invention aims to improve a durability in opening and closing action of the shutter. The shutter according to the invention is formed to have an arm portion extending from a shutter working portion, the arm portion being elastically deformed when the shutter opens, and a turned end portion extending from the arm portion toward the shutter working portion. The turned end portion is held by the shutter support portion at a location near the shutter working portion such that deformation of the turned end portion is not restricted when it elastically deforms in accordance with the opening movement of the shutter. Alternatively, the shutter main body, the shutter working portion and the arm portion which elastically deforms when the shutter working portion opens are integrally formed from a piece of spring plate, so that the number of component parts is reduced and attachment work of the shutter to the filler pipe is facilitated.

3 Claims, 9 Drawing Sheets

FUEL ERRONEOUS SUPPLY PREVENTION SHUTTER

BACKGROUND OF THE INVENTION

1. Industrial Field of the Invention

The present invention relates to improvement of a fuel erroneous supply prevention shutter provided in a filler neck portion of a filler pipe in an automobile.

2. Prior Art

There is provided in a filler neck portion of a filler pipe a shutter for preventing inadequate supply of different fuel. When a fuel exclusive for a car is supplied by a supply nozzle having a particular nozzle shape, the shutter is opened to admit the fuel supplying nozzle into the filler pipe so as to supply fuel to a fuel tank. In case of the inadequate kind of fuel, however, the shutter serves to inhibit the supplying nozzle from being inserted through a nozzle restricting passage formed in the filler neck portion. Further, when a distal end portion of the supplying nozzle is forced against the shutter to open it and to supply the fuel from the supplying nozzle, an automatically shut-off mechanism provided on the supplying nozzle operates to close the nozzle valve of the supplying nozzle in response to the existence of the shutter.

As examples of a conventional shutter having such function, there are listed both a shutter of a leaf spring type as disclosed in U.S. Pat. No. 4,135,562 or 4,770,677, and a shutter actuated by a coil spring as disclosed in U.S. Pat. No. 4,955,950.

In the latter shutter employing the coil spring, the number of component parts is large so that assembling work becomes tedious. On the contrary, the former shutter of a leaf spring type has an advantage in that it can be constituted simply.

However, the structure of the conventional shutter of the leaf spring type, has a fault of durability in opening and closing action which is a function of the shutter. This is because it is difficult to design the leaf spring such that it maintains a certain biasing force to suitably close the passage and it can be used within an elastic range.

Basically, if the deformable portion of the shutter is sufficiently elongated, stress is distributed without concentration and the deformable portion can bend within the elastic range. However, the deformable portion having a sufficient length cannot be formed under restraint of the inner space, where the shutter is to be housed, depending on a diameter of the filler pipe.

From the viewpoint of character of the leaf spring, unless the leaf spring is used within the elastic range of the spring character, it loses its elasticity because of metal fatigue during repetition of opening and closing movement, so that the shutter will not be again restored to the closing state.

The present invention aims to provide a fuel erroneous supply prevention shutter of a leaf spring type whose durability in opening and closing action is improved.

SUMMARY OF THE INVENTION

As a result of examination of the abovedescribed problems, the invention aims to provide a fuel erroneous supply prevention shutter of a leaf spring type retained in the vicinity of a filler neck of the filler pipe by a shutter support portion within the filler pipe of an automobile. The shutter is opened or closed when a fuel supplying nozzle is inserted in or extracted from the filler pipe. The shutter includes a shutter working portion, an arm portion which elastically deforms when the shutter opens, the arm portion extending continuously from the shutter working portion, and a turned end portion extending from the arm portion toward the shutter working portion. The turned end portion is held at a location near the shutter working portion by the shutter support portion in a free state so that it can freely elastically deform when the shutter opens.

This shutter support portion is a fixture portion positioned in the vicinity of a restriction passage for the supplying nozzle at the lower portion of a cap retainer. The cap retainer is arranged within the filler pipe near the filler neck. The turned end portion of the shutter is directly secured to the fixture portion. When an engagement portion of the cap retainer with the shutter cannot be provided at the lower portion of the cap retainer for the reasons of molding or the like, the lower portion of the cap retainer is outwardly clinched to support a shutter retaining plate which acts as the fixture portion.

In the fuel erroneous supply prevention shutter of the invention, the shutter retaining plate is separately produced and previously attached to the clinched lower end portion of the cap retainer. Alternatively, a retaining ring may be formed on the cap retainer itself.

With a structure which will be described below, a shutter and a shutter retaining plate are united into one part so that the shutter can readily be attached to a filler pipe.

More specifically, a shutter main body is integrally formed with a shutter working portion via an arm portion which elastically deforms when the shutter opens. The shutter main body surrounding the shutter working portion includes an opening having concave and convex portions on its periphery for engagement of the shutter main body with the lower portion of the cap retainer.

In the fuel erroneous supply prevention shutter, it is preferable that the shutter working portion and the arm portion are continuously cut from a piece of leaf spring plate whose outer periphery has a contour of the shutter main body to separate the outer periphery of the shutter working portion from the shutter main body, the outer periphery of the shutter working portion being formed with concave and convex portions. Further, it is preferable that the arm portion in succession with the shutter working portion and the shutter main body having an opening with concave and convex portions on its periphery are continuously formed from a piece of leaf spring plate, and the shutter plate is bent at the arm portion so as to fit the shutter working portion in the opening with the concave and convex portions on its periphery.

With such structure that the shutter main body is integral with the shutter working portion via the arm portion which elastically deforms when the shutter opens and that the concave and convex opening for engagement of the shutter main body with the lower portion of the cap retainer is formed in the shutter main body surrounding the shutter working portion, the whole of the fuel erroneous supply prevention shutter can be formed from a piece of steel plate (leaf spring) by pressing it, and the shutter can readily be combined with the nozzle restriction passage edge portion at the lower portion of the cap retainer in a snapping action.

Moreover, with the structures in which the arm portion leading to the shutter working portion and the shutter main body having the opening with the concave and convex portions on its periphery are continuously formed from a piece of leaf spring plate, and in which the shutter plate is bent at the arm portion to oppose the shutter working portion to the shutter main body, the elasticity of the arm portion increases and deformation at the proximal end of the arm portion in accordance with the opening or closing movement of the shutter working portion is not restricted. Moreover, the arm portion can deform within the elastic range of the spring character.

DETAILED DESCRIPTION OF THE INVENTION

Figure 1:
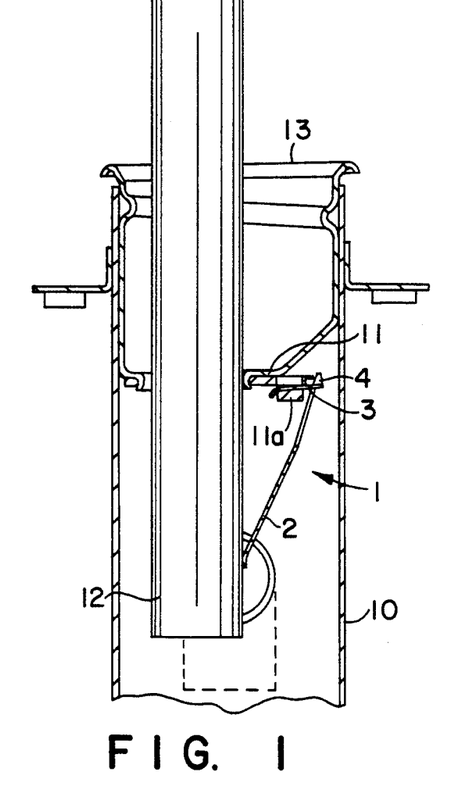
FIG. 1 is a longitudinally cross-sectional view of a filler neck when a fuel supplying nozzle is inserted.
Figure 2:
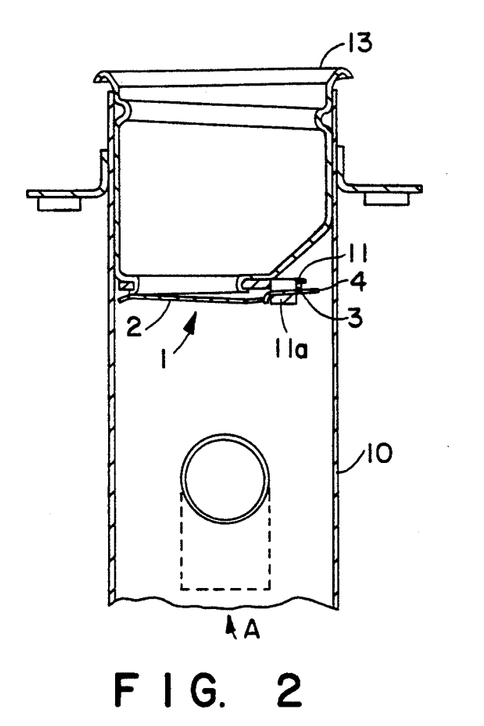
FIG. 2 is a longitudinally cross-sectional view of the filler neck when the fuel supplying nozzle is extracted.
Figure 3:
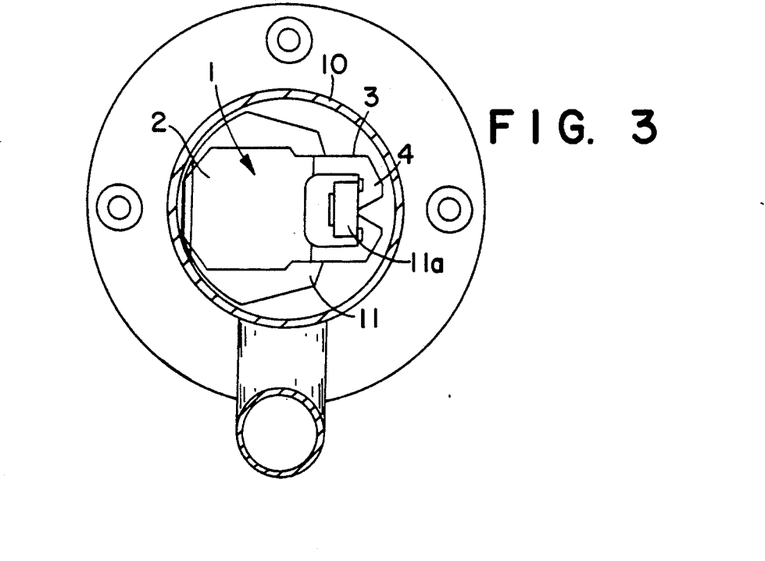
FIG. 3 is a laterally cross-sectional view, as viewed along an arrow A of FIG. 2.
Figure 4:
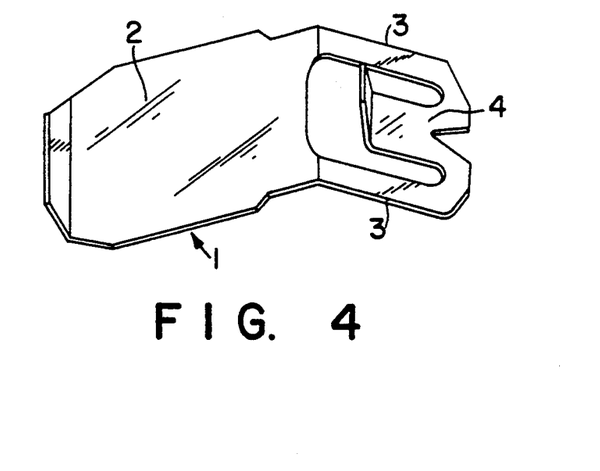
FIG. 4 is a perspective view of a fuel erroneous supply prevention shutter of FIG. 3.
Figure 5:
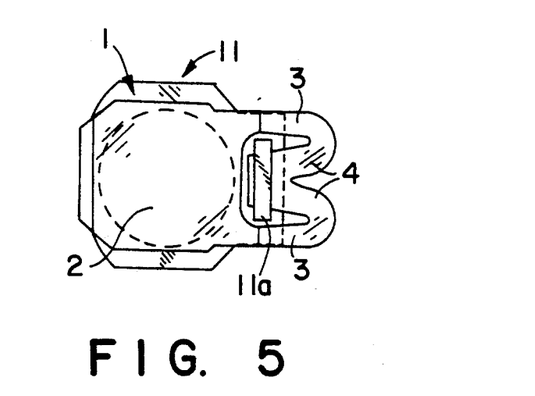
FIG. 5 is a view showing another example of an attachement state of a fuel erroneous supply prevention shutter, similarly to FIG. 3.
Figure 6:
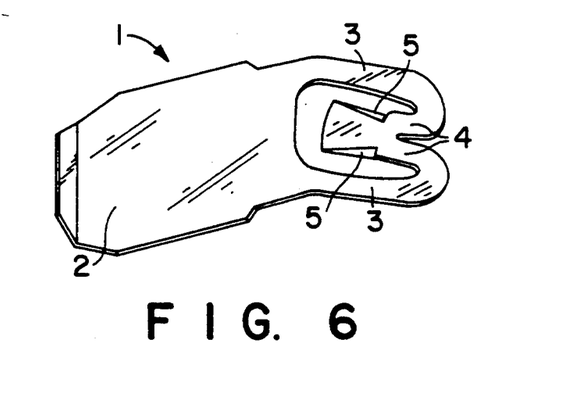
FIG. 6 is a perspective view showing the fuel erroneous supply prevention shutter of FIG. 5.

FIGS. 1 to 4 show a first embodiment of the invention. As shown in FIGS. 1 and 2, a fuel erroneous supply prevention shutter 1 of a leaf spring type is supported by a retaining plate 11 of a shutter support portion near a filler port of a filler pipe 10 of an automobile. The shutter is adapted to open or close when a fuel supplying nozzle 12 is inserted into or extracted from the filler pipe 10. FIG. 4 shows an overall appearance of the shutter 1 in detail. The fuel erroneous supply prevention shutter 1 includes a plate-like shutter working portion 2, an elastically deformable arm portion 3 leading from the working portion 2, and a turned end portion 4 extending from the arm portion 3 to the working portion 2. The turned end portion 4 is, as shown in FIG. 3, secured by a retaining ring 11a of the retaining plate 11 of the shutter support portion provided in the filler pipe. Referring to FIG. 2, at the shutter support portion, the shutter retaining plate 11 is fixedly held by an outwardly clinched peripheral edge of a restriction passage for the supplying nozzle at the lower portion of a cap retainer 13 fitted in the filler neck. The turned end portion 4 of the shutter 1 is inserted in and secured to the retaining ring 11a formed by partially cutting the retaining plate 11 at a location near the shutter working portion. A top end of the turned end portion 4 is so curved as to prevent the end portion 4 from slipping out of the retaining ring 11a. The turned end portion 4 is in a state of being freely deformable so that it can elastically deform when the shutter opens. FIGS. 5 and 6 illustrates a second embodiment of the invention. In the illustrated embodiment, the width of an arm portion 3 which elastically deforms when the shutter opens is increased so that the strength thereof becomes larger in accordance with the increment of the moment, because the moment at a portion more remote from a point of application by the supplying nozzle is larger. Also, bent-up edges 5 are formed on both sides of a turned end portion 4, which bent-up edges 5 serve to prevent the turned end portion 4 from slipping out of the retaining ring 11a formed on the retaining plate 11.

Figure 7:
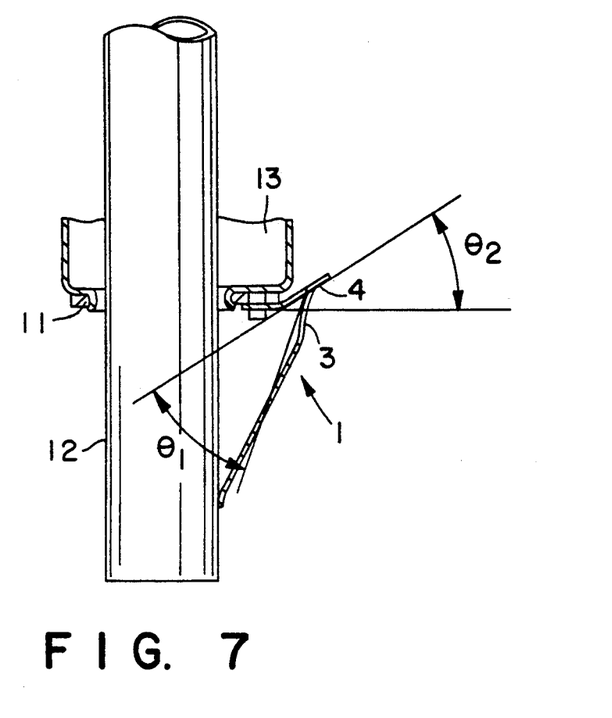
FIG. 7 is a side view for explanation of an operation of the shutter.

FIG. 7 indicates such a state that the shutter 1 of a leaf spring type is supported by the retaining plate 11 of the shutter support portion within the filler pipe 10, and that the supplying nozzle 12 is inserted in the filler pipe.

Figure 8:
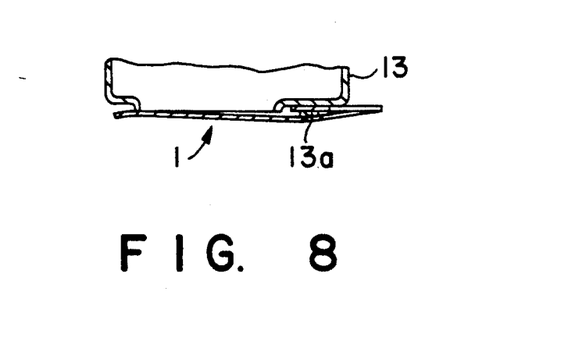
FIG. 8 is a cross-sectional view of another example of attachment of the fuel erroneous supply prevention shutter.

In the above-described embodiments, the retaining plate 11 is employed at the shutter support portion. The shutter 1 may be directly secured to a portion in the vicinity of the nozzle restriction passage at the lower portion of the cap retainer in the filler neck. FIG. 8 shows one example of such case. When the shutter 1 is attached to the lower portion of the cap retainer without using the retaining plate, the shutter 1 can be readily attached by inserting the end portion of the shutter into a retaining ring 13a directly formed on the lower portion of the cap retainer 13, by riveting, by direct spot welding, by brazing and so on.

Figure 9:
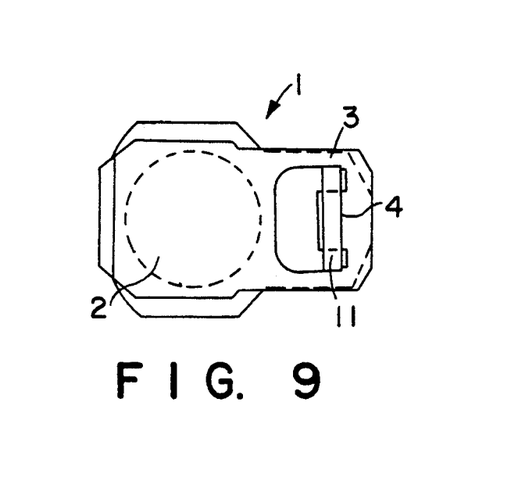
FIG. 9 is a view showing an attachment state of a conventional fuel erroneous supply prevention shutter, similarly to FIG. 3.
Figure 10:
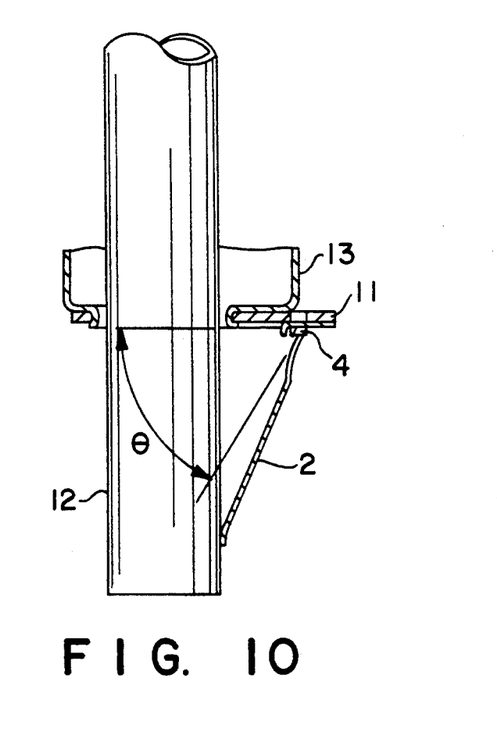
FIG. 10 is a side view for explanation of an operation of the conventional shutter.

In contrast with the example of the invention illustrated in FIG. 7, FIG. 10 shows a conventional example of a shutter of FIG. 9 whose turned end portion extending from an arm portion 3 toward a working portion 2 is short and which has no notch at a central portion of the arm portion. An amount of deformation of a leaf spring increases in proportion to a deformation angle $\theta$, as shown in FIG. 10. In the example of FIG. 10, the turned end portion 4 is short and the deformation is restricted, as indicated in the drawing. The shutter is deformed at one portion at the angle $\theta$ with respect to a horizontal line. On the contrary, as illustrated in FIG. 7, the shutter 1 of the invention deforms at two portions when the fuel supplying nozzle is inserted in the filler pipe. The turned end portion 4 deforms at an angle of $\theta$ 1 and the arm portion 3 deforms at an angle of $\theta$ 2 with respect to the horizontal line. The deformation angle $\theta$ of the conventional shutter shown in FIG. 10 is divided into the deformation angles $\theta$ 1 and $\theta$ 2 of the shutter of the invention. Thus, the leaf spring plate of the shutter member can deform within an elastic range.

In third to sixth embodiments described below, on the basis of the technical concept of the first and second embodiment, a fuel erroneous supply prevention shutter 1 is wholly formed from a spring member integral with a shutter working portion 2, thereby simplifying manufacturing work of the shutter.

Figure 11:
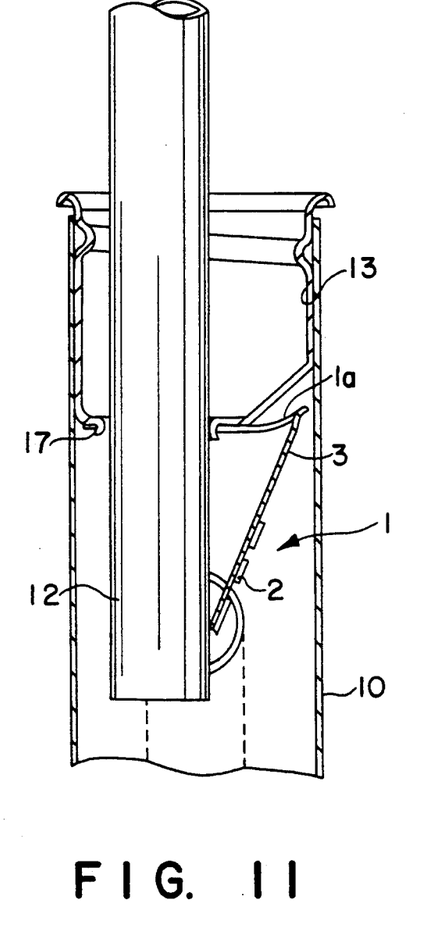
FIG. 11 is a cross-sectional view illustrative of another embodiment of the invention, similarly to FIG. 1.
Figure 12A:
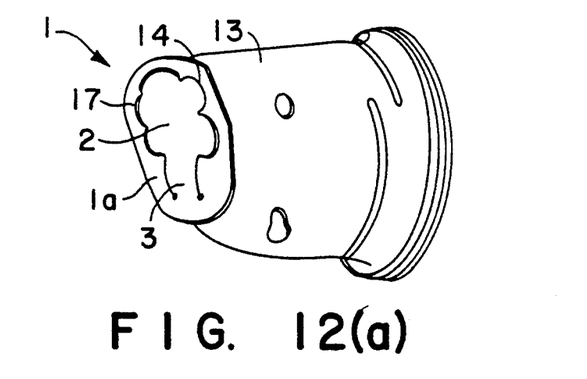
FIG. 12(a) is a perspective view in the case where a fuel erroneous supply prevention shutter of FIG. 11 is attached to the lower portion of the cap retainer.
Figure 12B:
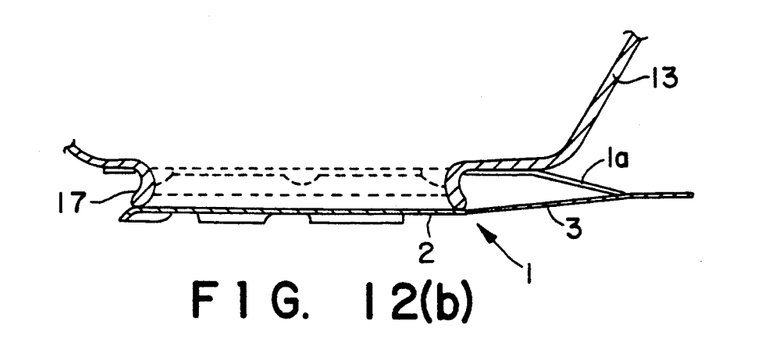
FIG. 12(b) is an enlarged view of essential portions of the cap retainer and the fuel erroneous supply prevention shutter when the shutter is attached to the lower portion of the cap retainer.

FIG. 11 is a cross-sectional view showing a third embodiment of the invention in which a fuel erroneous supply prevention shutter including a shutter retaining plate integrally formed therewith, is housed within the filler pipe. FIG. 12(a) is a perspective view illustrating the lower portion of the cap retainer in the third embodiment; FIG. 12(b) is an enlarged view of the essential portions of the cap retainer and the fuel erroneous supply prevention shutter when the shutter is attached to the lower portion of the cap retainer; and FIG. 12(c) is a top plan view of the fuel erroneous supply prevention shutter.

As clearly understood from FIG. 11, the fuel erroneous supply prevention shutter 1 of the third embodiment is held by the shutter support portion in the vicinity of the filler neck of the filler pipe 10 of an automobile or the like. The shutter 1 is of a leaf spring type and it is opened or closed when a fuel supplying nozzle 12 is inserted into or extracted from the filler pipe 10. A shutter main body 1a, which is integral with a shutter working portion 2, is directly engaged with the nozzle restriction passage edge portion 17 at the lower portion of the cap retainer 13 so as to support the shutter 1.

Figure 12C:
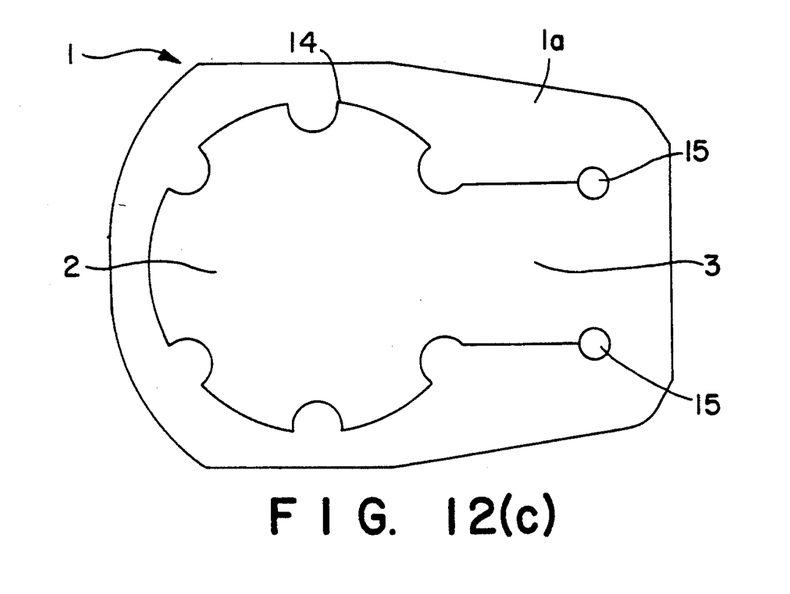
FIG. 12(c) is a top plan view of the fuel erroneous supply prevention shutter.

As shown in FIG. 12(c), the fuel erroneous supply prevention shutter 1 includes the shutter working portion 2 formed substantially at its central portion, an arm portion 3 which elastically deforms when the shutter 1 opens, and the shutter main body 1a surrounding the shutter working portion 2. The shutter main body 1a surrounding the shutter working portion 2 and the arm portion 3 are integrally formed by cutting and pressing a piece of spring steel plate. The shutter working portion 2 is enough large to close the nozzle restriction passage at the lower portion of the cap retainer 13. The shutter main body 1a surrounding the shutter working portion 2 is formed with an opening 14 having concave and convex portions on its periphery for engagement of the shutter main body with the nozzle restriction passage edge portion 17. There are provided through holes 15, 15 at terminal ends of a boundary line between the shutter main body 1a and the arm portion 3, in order to prevent occurrence of a crack from the terminal ends. The opening 14 having the concave and convex portions on its periphery is fitted on and engaged with the nozzle restriction passage edge portion 17 at the lower portion of the cap retainer 13 (FIG. 12(a), (b)), thereby housing the fuel erroneous supply prevention shutter 1 in the filler pipe.

Accordingly, the shutter 1 can readily be engaged with the cap retainer 13. The shutter 1 can be manufactured from a piece of leaf spring plate. Further, similarly to the first and second embodiments, when the shutter working portion 2 is opened, the shutter main body 1a and the arm portion 3 respectively deform within the elastic range, as illustrated in FIG. 11.

Figure 13A:
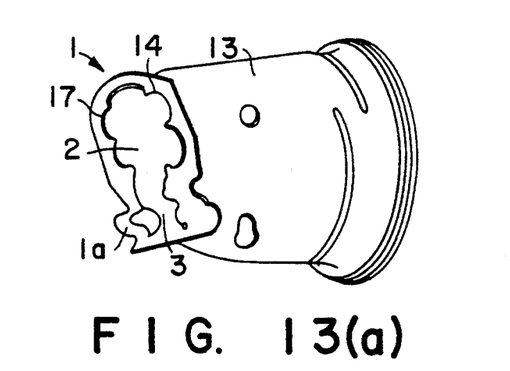
FIG. 13(a) is a perspective view in the case where a modified fuel erroneous supply prevention shutter is attached to the lower portion of the cap retainer.
Figure 13B:
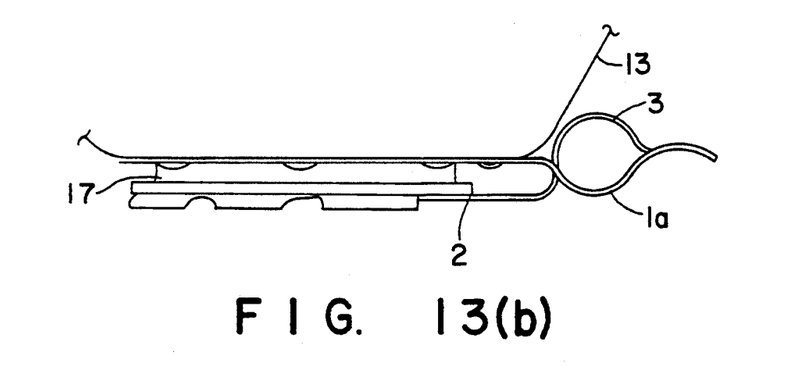
FIG. 13(b) is an enlarged view of the essential portions of the cap retainer and the fuel erroneous supply prevention shutter when the shutter is attached to the lower portion of the cap retainer.
Figure 13C:
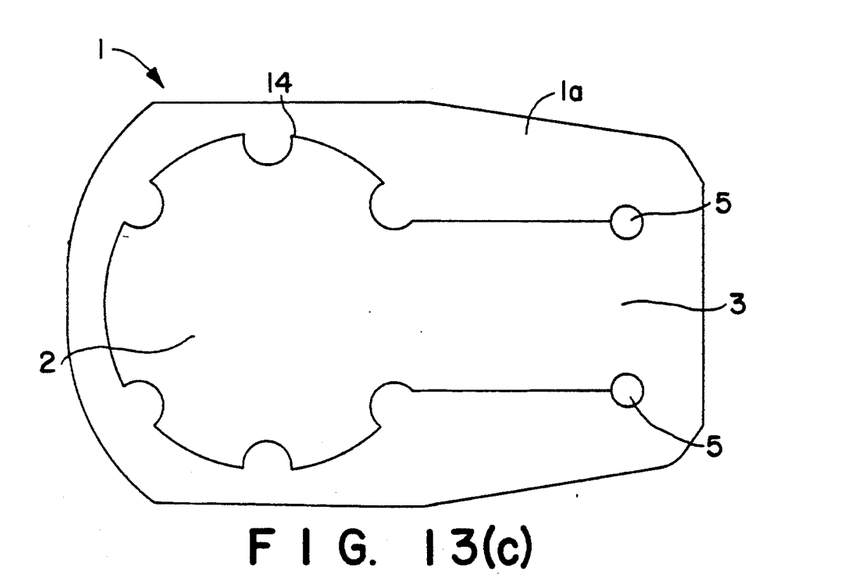
FIG. 13(c) is a top plan view of the fuel erroneous supply prevention shutter.

FIG. 13(a) is a perspective view showing a case where a fuel erroneous supply prevention shutter of a fourth embodiment is attached to the lower portion of the cap retainer; FIG. 13(b) is an enlarged cross-sectional view of the essential portions of the shutter and the cap retainer when the shutter is attached to the lower portion of the cap retainer; and FIG. 13(c) is a top plan view of the fuel erroneous supply prevention shutter.

The fuel erroneous supply prevention shutter of the fourth embodiment has a shape substantially the same as that of the third embodiment. An arm portion 3 of the shutter in the fourth embodiment has a slightly larger length of that of the shutter in the third embodiment. A shutter main body 1a and the arm portion 3 are curved in transverse directions to each other so as to increase elasticity of the shutter, as shown in FIG. 13(b).

Figure 14A:
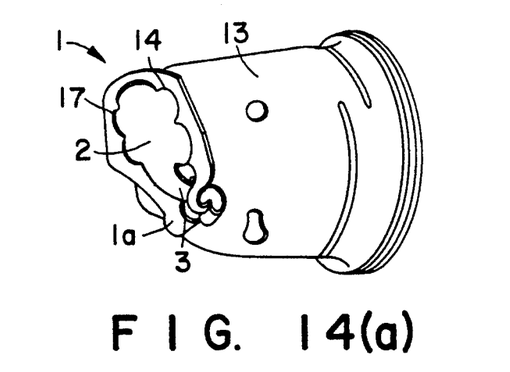
FIG. 14(a) is a perspective view in the case where a further modified fuel erroneous supply prevention shutter is attached to the lower portion of the cap retainer.
Figure 14B:
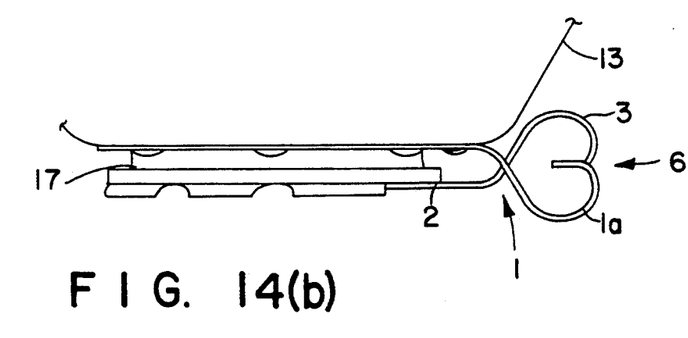
FIG. 14(b) is an enlarged view of the essential portions of the cap retainer and the fuel erroneous supply prevention shutter when the shutter is attached to the lower portion of the cap retainer.
Figure 14C:
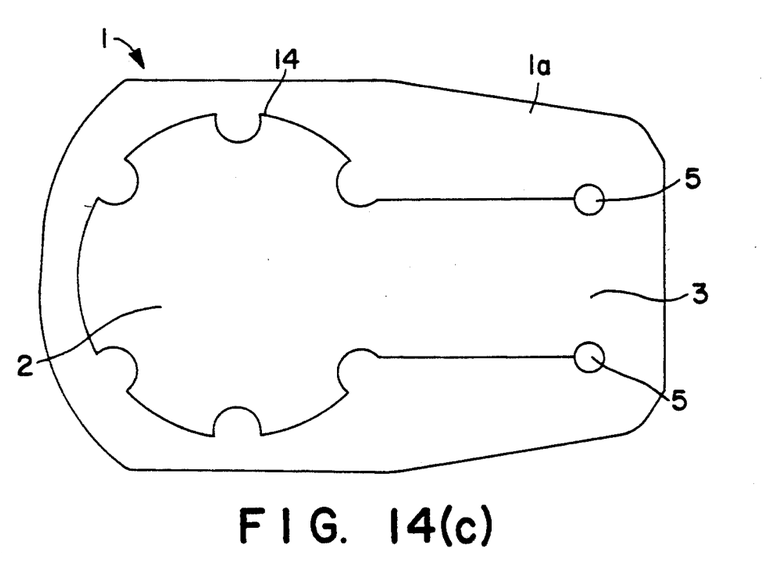
FIG. 14(c) is a top plan view of the fuel erroneous supply prevention shutter.

FIG. 14(a) is a perspective view showing a case where a fuel erroneous supply prevention shutter of a fifth embodiment is attached to the lower portion of the cap retainer; FIG. 14(b) is an enlarged cross-sectional view of the essential portions of the shutter and the cap retainer when the shutter is attached to the lower portion of the cap retainer; and FIG. 14(c) is a top plan view of the fuel erroneous supply prevention shutter.

The fuel erroneous supply prevention shutter in the fifth embodiment also has a shape substantially the same as those of the shutters in the third and fourth embodiments. An arm portion 3 has a further larger length. The shutter main body 1a and the arm portion 3 are turned from their proximal portions at angles of 180°. As shown in FIG. 14(b), the shutter main body 1a and the arm portion extends symmetrically with each other with respect to a horizontal line so as to form a bent portion 6 heart-shaped in cross-section, thereby applying a large elasticity to the shutter.

Figure 15A:
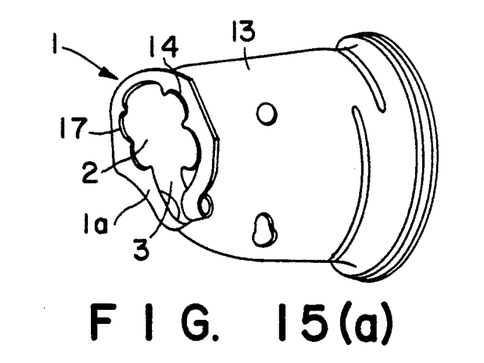
FIG. 15(a) is a perspective view in the case where a still further modified fuel erroneous supply prevention shutter is attached to the lower portion of the cap retainer.
Figure 15B:
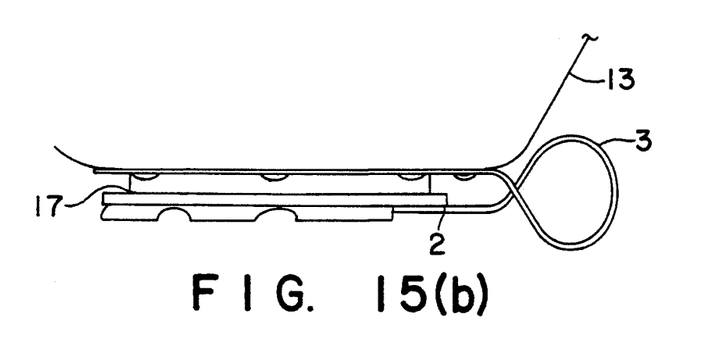
FIG. 15(b) is an enlarged view of the essential portions of the cap retainer and the fuel erroneous supply prevention shutter when the shutter is attached to the lower portion of the cap retainer.

FIG. 15(a) is a perspective view showing a case where a fuel erroneous supply prevention shutter of a sixth embodiment is attached to the lower portion of the cap retainer; FIG. 15(b) is an enlarged cross-sectional view of the essential portions of the shutter and the cap retainer when the shutter is attached to the lower portion of the cap retainer; and FIG. 15(c) is a top plan view of the fuel erroneous supply prevention shutter.

Figure 15C:
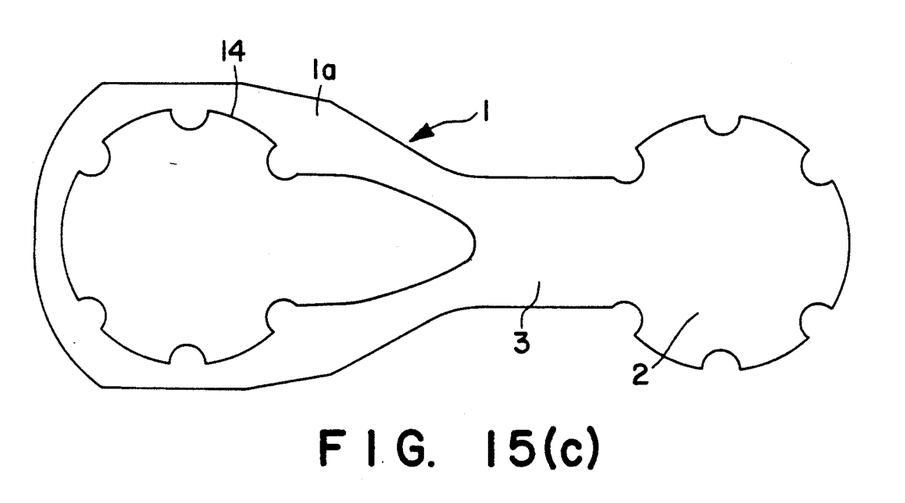
FIG. 15(c) is a top plan view of the fuel erroneous supply prevention shutter.

In the sixth embodiment, as shown in FIG. 15(c), an arm portion 3 is formed to extend from a shutter working portion 2 illustrated in FIG. 15(c). A shutter main body 1a including an opening 14 having concave and convex portions on its periphery is formed in succession with the arm portion 2. The arm portion 3, the shutter main body 1a and the shutter working portion 2 are integrally formed from a piece of steel plate. The fuel erroneous supply prevention shutter is folded into two substantially at its central portion so that the shutter working portion 2 exists within the opening 14 having the concave and convex portions on its periphery. The nozzle restriction passage edge portion 17 at the lower portion of the cap retainer is inserted in the opening 14 to thereby engage the shutter main body 1a with the nozzle restriction passage edge portion 17.

In the fuel erroneous supply prevention shutter having the above-described structure and function according to each of the third to sixth embodiments of the invention, since the opening through which the fuel supplying nozzle passes is formed to have a periphery with concave and convex portions, the shutter is prevented from rotation. The shutter is formed from a piece of leaf spring plate, so that the number of component parts is decreased. Particularly, the third to fifth embodiments have an advantage in that the material is efficiently used so that the weight and cost can be reduced. Moreover, the convex portions on the periphery of the opening of the shutter main body facilitates attachment of the shutter to the cap retainer. Therefore, attachment work of the shutter to the cap retainer can easily be automatized.

Further, in the fuel erroneous supply prevention shutter according to the invention, deformation of the leaf spring is shared so that the shutter can be used within a restricted space without resulting in permanent deformation. As a result, a durability of the shutter is improved.

Moreover, the following additional effects can be obtained. That is to say, various kinds of surface treatments are applied on inner and outer surfaces of a filler pipe made from iron steel plate as a countermeasure against rust. After attaching the shutter to the filler pipe, the treatment cannot be applied uniformly on the inner surface of the pipe unless the shutter is opened. Because the treatment at that time is applied with heat being imposed on the surface of the pipe, there occurs such a problem that the shutter working portion having the spring character is not again restored to its original state due to the heat after the treatment has been conducted and the shutter cannot fulfill its function. In the invention, the deformable portion of the shutter deforms within the elastic range under such a condition that the shutter is opened, and accordingly, the present invention can solve such problem as deterioration of elasticity of the shutter due to the heat.

What is claimed is:

1. A fuel erroneous supply prevention shutter of a leaf spring type retained in the vicinity of a filler neck of a filler pipe by a shutter support portion within the filler pipe of an automobile, said shutter being opened or closed when a fuel supplying nozzle is inserted in or extracted from said filler pipe, wherein a main body of said shutter is integrally formed with a shutter working portion via an arm portion which elastically deforms when the shutter opens, and said shutter main body surrounding said shutter working portion includes an opening having concave and convex portions on its periphery for engaging said shutter main body with the lower portion of a cap retainer.

2. A fuel erroneous supply prevention shutter according to claim 1, wherein said shutter working portion and said arm portion are continuously cut from a piece of leaf spring plate whose outer periphery has a contour of the shutter main body to separate the outer periphery of the shutter working portion from the shutter main body, said outer periphery of the shutter working portion being formed with concave and convex portions.

3. A fuel erroneous supply prevention shutter according to claim 1, wherein said arm portion extending in succession with said shutter working portion and said shutter main body having the opening with the concave and convex portions on its periphery are continuously formed from a piece of leaf spring plate, and said shutter plate is bent at said arm portion to fit said shutter working portion in said opening.

* * * * *